(12) United States Patent
Castonguay et al.

(10) Patent No.: US 7,773,851 B2
(45) Date of Patent: Aug. 10, 2010

(54) ATTENUATED OPTICAL SPLITTER MODULE

(75) Inventors: Guy Castonguay, Ft. Worth, TX (US); Konstantinos Saravanos, Highland Village, TX (US); Michael Heath Rasmussen, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/214,889

(22) Filed: Jun. 23, 2008

(65) Prior Publication Data

US 2009/0087140 A1 Apr. 2, 2009

Related U.S. Application Data

(63) Continuation of application No. 11/807,618, filed on May 30, 2007, now Pat. No. 7,391,954.

(51) Int. Cl.
*G02B 6/00* (2006.01)
*G02B 6/26* (2006.01)
(52) U.S. Cl. ............... 385/140; 385/31; 385/45
(58) Field of Classification Search ........... 385/31, 385/45, 140
See application file for complete search history.

(56) References Cited

U.S. PATENT DOCUMENTS 6,711,342 B2 * 3/2004 Pavlath et al. ............ 385/147
2002/0110328 A1 * 8/2002 Bischel et al. ............ 385/49

2005/0123232 A1 6/2005 Piede et al. ............ 385/14

OTHER PUBLICATIONS

Schmidt, et al., "Recent Advances in Single Mode 1×N Splitters Using High Silica Optical Waveguide Circuit Technology," Applications of Optical Engineering: Proceedings of OE Midwest '90, Sep. 27-28, 1990, vol. 1396, Jan. 1, 1990, pp. 744-752, pp. 746, 749; figures 4, 5a-b, 9b.
"Abzweigelemente,"Funkschau, Weka Facheitschriften Verlag, Poing, DE, vol. 71, No. 25, Nov. 27, 1998, pp. 57-58, figures 4,5.
Denis Penninckx, "Numerical Optimization of Large-Scale Fiber-Optic Splitting Tree Uniformity," IEEE Photonics Technology Letters, vol. 18, No. 6, Mar. 2006, pp. 785-787, p. 785, figure 1.
Patent Cooperation Treaty, International Search Report for International Application No. PCT/US08/006749, Sep. 22, 2008, 2 pages.
* cited by examiner

*Primary Examiner*—Charlie Peng
(74) *Attorney, Agent, or Firm*—John H. Vynalek

(57) ABSTRACT

A compact optical splitter module is disclosed. One type of compact optical splitter module is a planar attenuated splitter module that includes a branching waveguide network having $j \geq 1$ 50:50 splitters that form up to $n \leq 2^j$ output waveguides having associated n output ports, wherein only m<n output ports are suitable for transmitting light to the at least one external output device. This provides a 1×m splitter module wherein each output port has the attenuation of a 1×n splitter module, thereby obviating the need for external attenuation. Another type of compact optical splitter module is a direct-connect splitter module that eliminates the need for an optical fiber array when coupling to external optical fibers. Another type of compact optical splitter module is a microsplitter module that serves as device and module at the same time and that eliminates the differentiation between device and module. The integration of device and module also makes manufacturing the microsplitter module cost-effect. Embodiments of microsplitter modules that account for differences in the coefficient of thermal expansion of the materials making up the microsplitter are also disclosed.

8 Claims, 16 Drawing Sheets

ATTENUATED OPTICAL SPLITTER MODULE

CROSS REFERENCE TO RELATED APPLICATION

This application is a continuation of U.S. application Ser. No. 11/807,618, filed May 30, 2007 now U.S. Pat. No. 7,391,954, which is hereby incorporated herein in its entirety by reference.

BACKGROUND OF THE INVENTION

1. Field of the Invention

The present invention relates generally to passive optical devices used in optical telecommunication systems, and particularly to optical splitters modules.

2. Technical Background

One of the current trends in telecommunications is the use of optical fibers in place of the more conventional transmission media. One advantage of optical fibers is their larger available bandwidth handling ability that provides the capability to convey larger quantities of information for a substantial number of subscribers via a media of considerably smaller size. Further, because lightwaves are shorter than microwaves, for example, a considerable reduction in component size is possible. As a result, a reduction in material, manufacturing, and packaging costs is achieved. Moreover, optical fibers do not emit electromagnetic or radio frequency radiation of any consequence and, hence, have negligible impact on the surrounding environment. As an additional advantage, optical fibers are much less sensitive to extraneous radio frequency emissions from surrounding devices and systems.

With the advent of optical fiber networks, flexible switching devices are needed to direct light signals between fibers in an all-optical domain fiber network. An optical splitter is a type of optical switching device that takes an incoming optical signal and splits it between two or more outputs. The number of splits depends on the particular application. Because the signal is split into two or more signals, the splitter is also an attenuator whose attenuation is proportional to the number of splits. Optical splitters, also referred to as "splitter modules" because of their modular construction, have a number of shortcomings that, if improved upon, would result in a more robust splitter module for certain applications.

One splitter module shortcoming involves the need to use external attenuators for certain applications. For FTTx systems with link budgets designed for a particular number of splits, a reduced number of splits may be required, but with the same attenuation. For example, for a splitter module having a splitter chip designed for 1×32 splits (15-17 dB IL), a 1×4 splitter chip may be needed, where each of the 4 splitter output ports serves electronics that connect eight customers in a multi-dwelling unit (MDU) (the 1×4 optical split still serves thirty-two customers). The optical power required by the receiving electronics, however, may still be in the 15-17 dB range, while the 1×4 splitter module delivers 6-8 dB of optical power. This necessitates attenuation of the splitter output from 6-8 dB to 15-17 dB. This is typically accomplished using an attenuator external to the splitter. However, this adds complexity and expense to the splitter system and also makes it less compact.

Another shortcoming is that present-day splitter modules consist of separate parts: a standard splitter unit (that includes a fiber array, a splitter chip, and a ferrule) and external connectors that attach thereto. External connectors are connected to the module to establish communication through the module between remote devices. Considerable simplification and cost reduction for splitter modules could be realized if an external multi-fiber connector could be directly connected to the planar splitter chip rather than using separate connectors. Likewise, considerable simplification and cost reduction (and cost predictability) for splitter modules could be realized if a compact splitter module could be constructed that serves as both as device and module without the usual distinction between the two.

SUMMARY OF THE INVENTION

One aspect of the invention is an attenuated planar splitter module for providing optical communication with at least one external output device. The splitter module includes a splitter chip having a body, an input end, an output end, and a branching waveguide network associated with the body. The branching waveguide network includes an input waveguide optically coupled to an input connector at the input end. The branching waveguide network has $j \geq 1$ 50:50 splitters that form up to $n \leq 2^j$ output waveguides having associated n output ports, wherein only $m < n$ of the output ports are suitable for transmitting light to the at least one external output device. The splitter module also includes a fiber array attached to the splitter chip output end. The fiber array is adapted to provide optical coupling to the m suitable output ports of the splitter chip such that the m suitable output ports have associated therewith an attenuation in decibels of $A_o = 10 \log(2^j)$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

Figure 1:
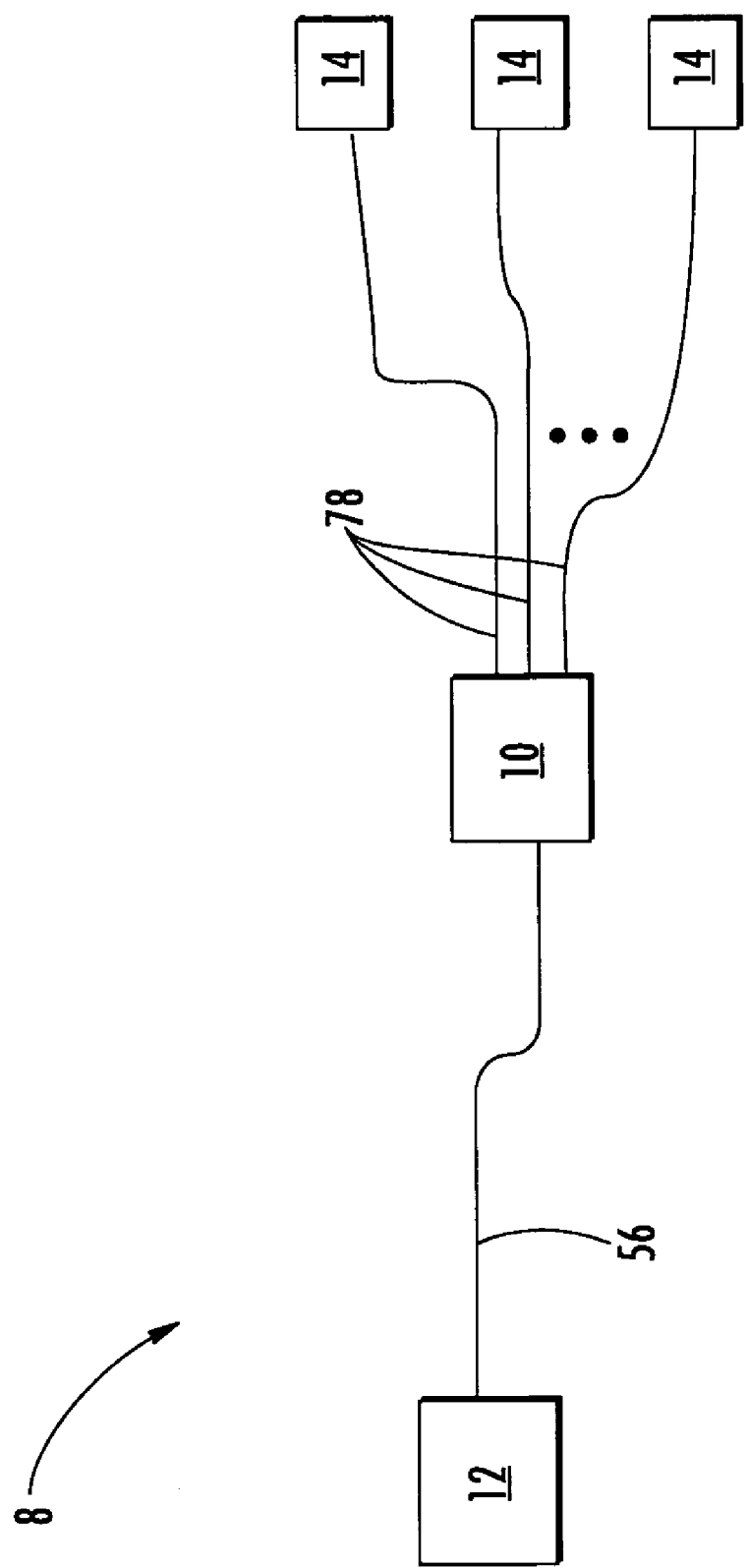
FIG. 1 is generalized schematic diagram of a splitter module system that includes the splitter module of the present invention optically coupled to an input device and at least one output device.

FIG. 1 illustrates a generalized example embodiment of a splitter module system 8 that includes a splitter module 10 according to the present invention. Splitter module 10 is connected to an external input device 12 via an input optical fiber 56 and to one or more external output devices 14 via corresponding output optical fibers 78. Both external input device 12 and external output device 14 can be capable of transmitting and receiving signals and communicating with each other via module 10 in both directions, but are referred to as input and output devices for the sake of simplicity and establishing an orientation in the Figures.

The present invention is directed to various types of splitter modules 10 that provide enhanced performance as well as other advantages. Example embodiments of the various types of optical splitter modules are described in detail below.

Attenuated Planar Splitter Module

Figure 2:
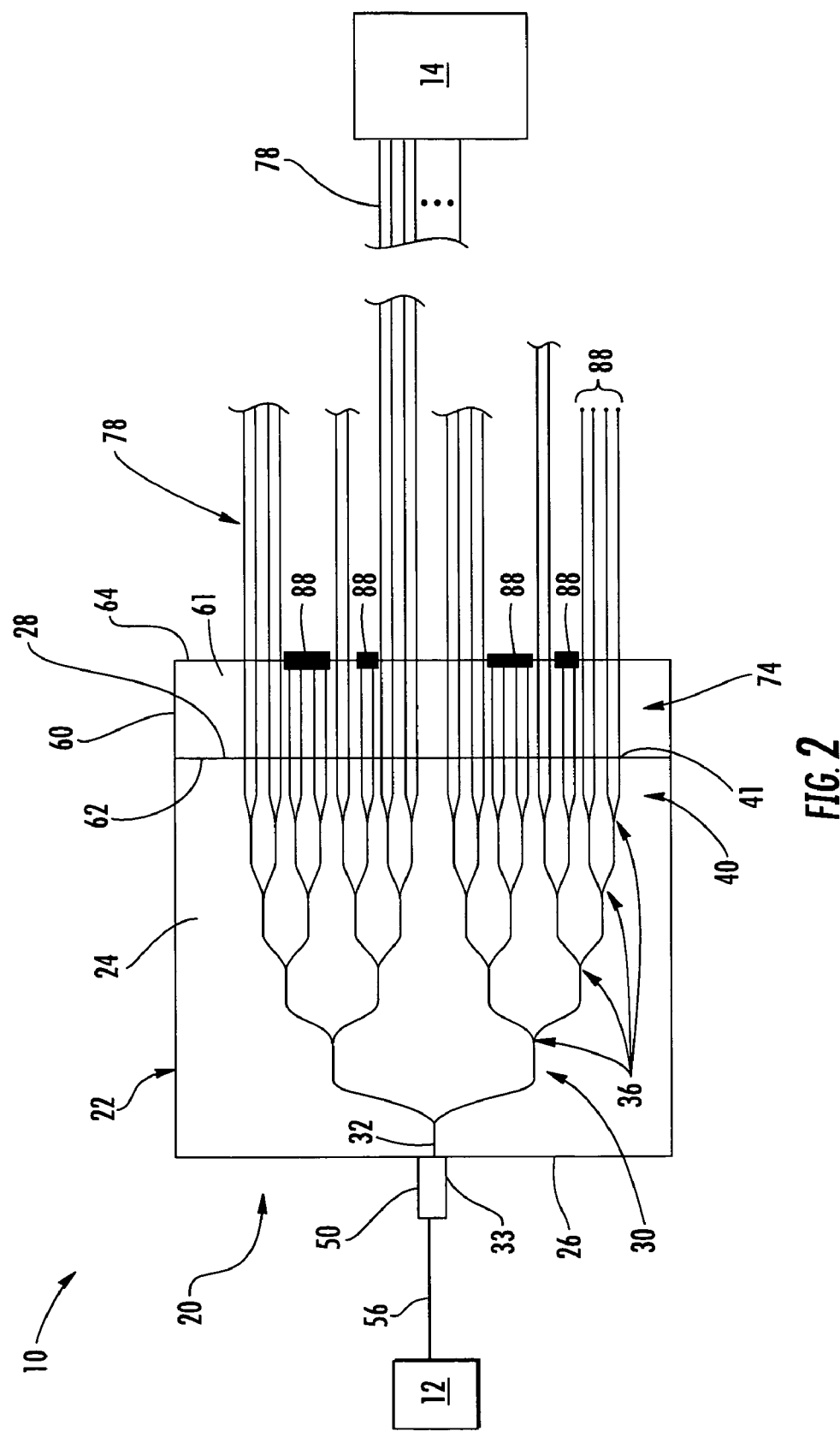
FIG. 2 is a plan schematic diagram of an example embodiment of an attenuated planer splitter module according to the present invention as connected to input and output devices, wherein at least one of the waveguides in the branching waveguide array has an associated termination so that the light from the input device and carried therein is not communicated to the external device.

FIG. 2 is a schematic plan view of an attenuated planar splitter module 10 according to the present invention shown connected to external input device 12 and one external output devices 14 (one such external output device is shown by way of illustration), such as shown in FIG. 1.

Module 10 includes a splitter chip 20 having a body 22, an upper surface 24, an input end 26 and an output end 28. Formed in or on body 22 (i.e., on or below surface 24) is a branching waveguide network 30. Branching waveguide network 30 starts out as a single input waveguide 32 with an input end (port) 33 at input end 26 and splits j times at various 50:50 splitters 36 to ultimately form $n=2^j$ output waveguides 40 each having an output end (port) 41 at output end 28. Note that branching waveguide network 30 can have one or more input waveguides 32; one such waveguide is shown for ease of illustration.

For the example splitter chip 20 of FIG. 2, j=5, so that the number n of output waveguides 40 is $2^5=32$. The output power associated with each output port 41 is 1/n as compared to the power inputted at input port 33, so that for n=32, the output power at each port is 1/32. In the convention of optical fiber telecommunications, the attenuation is expressed in decibels (dB). Thus, the attenuation $A_O$ associated with each of the n output ports 41 (for the case where $n=2^j$) is given by $A_O=-10\log(P_{IN}/P_{OUT})$, which for $P_{IN}$ normalized to 1 and $n=2$ is given by $A_O(n)=-10\log(1/n)=10\log(n)$. Thus, for n=2, $A_O(2)=3$ dB; for n=4, $A_O(4)=6$ db; for n=8, $A_O(8)=$ is 9 dB; for n=16, $A_O(16)=12$ dB, etc.

Module 10 includes an input ferrule 50 operably connected to input port 33 of input waveguide 32. Input ferrule 50 allows an input optical fiber 56 to be optically coupled to input waveguide 32. Connecting input optical fiber 56 to external input device 12 allows the input device to be in optical communication with one or more external output device 14 via module 10.

Module 10 also includes a fiber array 60 having a body 61, and input end 62 and an output end 64. Fiber array 60 includes a plurality of optical fiber sections 74, supported by substrate body 61 (e.g., via v-grooves formed therein). Fiber array 60 is arranged with its input end 62 fixed to splitter chip output end 28 so that optical fiber sections 74 align with output ports 41. This provides optical coupling between optical fiber sections 74 and output waveguides 40 of splitter chip 20. Fiber array 60 thus allows corresponding one or more output optical fibers 78 to be placed in optical communication with their respective output waveguides 40 of splitter chip 20, thereby providing optical communication between external input device 12 and one or more external output devices 14.

It often happens that a 1×n splitter chip 20 has one or more output ports 41 that do not meet specification and are therefore unsuitable for use. This can occur due to, for example manufacturing errors in branching waveguide network 30 or because of problems in the output ports themselves. Such errors lead to, for example, broken or otherwise defective waveguides that do not meet the required transmission-related specifications. Splitter chips that do not meet specification for all n output ports are considered to have little if any value and are typically scrapped. Given that the typical yield in splitter chip production is about 60%, this leaves 40% of product being scrapped.

However, where there are at least "m" good (i.e., suitable) ports 41 remaining on the 1×n splitter chip 20 that can be used for communicating with external device 14, the present invention exploits these m remaining suitable ports and utilizes the otherwise "damaged" splitter chip as a 1×m splitter, with each output port having the attenuation of a 1×n splitter. If necessary, the unsuitable and therefore unused (n−m) output ports 41 are terminated (e.g., using terminations 88, discussed below) in a manner that prevents any light that could be emitted by these ports from being transmitted to an external device. For example, the corresponding optical fiber section 74 in fiber array 60 is terminated, e.g., by allowing the light associated therewith to dissipate either in substrate body 12 or the material making up fiber array body 61 (e.g., potting compound or glass). In an example embodiment, light associated with an unsuitable output port 41 can be dissipated by allowing it to exit the output port and be transmitted into free space. In another example embodiment, such light is dissipated by a termination 88 in the form of a short section of optical fiber connected to a corresponding optical fiber section in fiber array 60, wherein the termination has an absorbing material at its output end. This is illustrated in FIG. 2, wherein module 10 is shown with a number of output fibers 78 optically coupled to select operable output ports 41 via output waveguide device 66. Those output ports 41 where other output fibers 78 would connect to output waveguide device 66 are shown as having corresponding terminations 88 at the corresponding optical fiber sections 74. Terminations 88 include, for example, short optical fiber sections as mentioned above, a light-absorbing material, or a light-dissipating material (e.g., potting compound).

Figure 3:
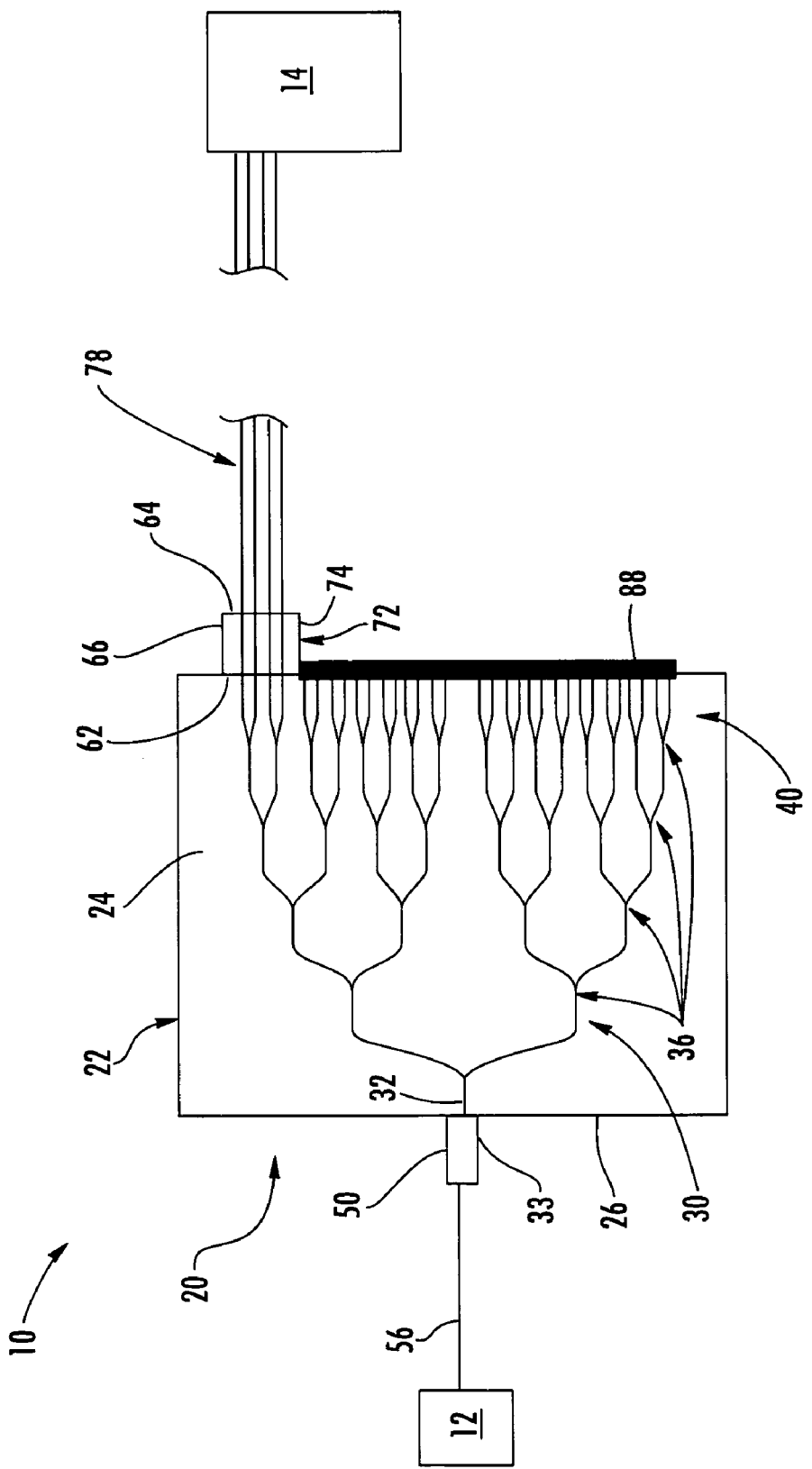
FIG. 3 is a plan schematic diagram of an example of an attenuated planar splitter module similar to that of FIG. 2, wherein the module is used as a 1×4 splitter module having the attenuation of a 1×32 splitter module.

FIG. 3 is a plan schematic diagram of an example embodiment of a planar attenuated splitter module 10 similar to that of FIG. 2, wherein the 1×32 splitter chip 20 meets specification on only m=4 adjacent channels (output ports) 41, thereby forming a 1×4 splitter module having the same attenuation as the 1×32 module. Four optical fibers 78 are coupled to the four operable channels via an output waveguide device 66 having a waveguide array 72 with four waveguides. Terminations 88 are provide at the remaining unsuitable output ports 41.

In an example embodiment of the invention, rather than using a splitter chip that includes one or more unsuitable output ports due to manufacturing errors, a 1×m splitter chip 20 is fabricated to have the attenuation of a 1×n splitter but with only m<n output ports. This is accomplished, for example, by incorporating one or more additional splitters 36 into splitter chip 20, with corresponding one or more waveguides associated therewith that carry light that is not meant to be provided to external device 14. In this case, the one or more extra splitters 36 act as attenuators, thereby obviating the need for external attenuators. Such a 1×m splitter chip 20 is less expensive than a 1×n splitter chip because it can be made smaller and does not require external attenuators. In this example embodiment wherein each split does not lead to an operable output port 41, the number of output ports 41 is less than $2^j$. The overall attenuation of such a splitter is given by the more general expression $A_O(j)=-10 \log(\frac{1}{2^j})=10 \log(2^j)$, where j is the number of splitters 36.

Figure 4:
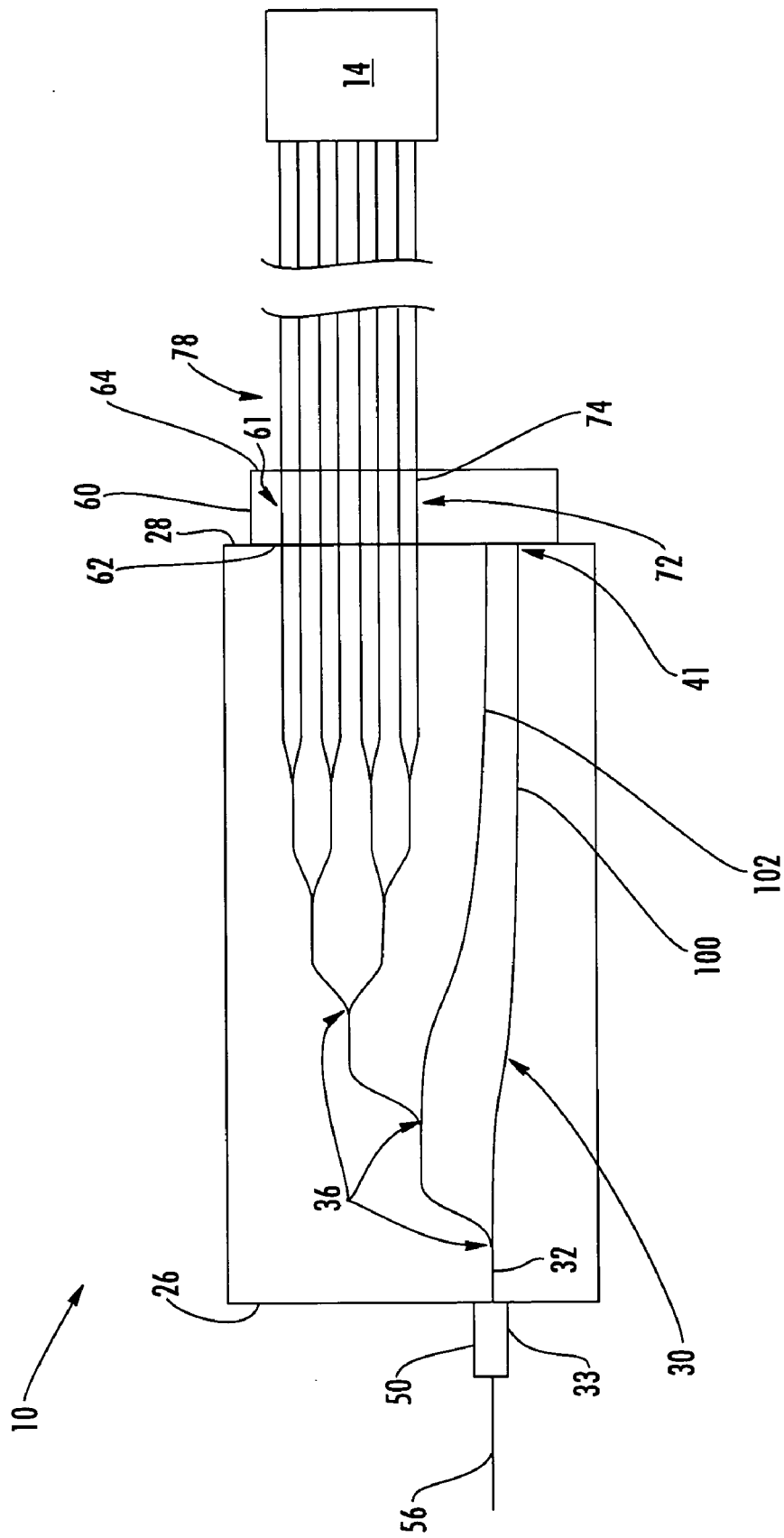
FIG. 4 is a plan schematic diagram of an embodiment of a 1×8 attenuated planer splitter module having a branching waveguide network that includes two non-branching waveguides whose energy is outputted at their respect output ports and is dissipated by the output waveguide device, thereby providing the 1×8 splitter module with the attenuation of a 1×32 splitter module.

FIG. 4 is a plan schematic diagram of an example embodiment of an attenuated splitter module 10 according to the present invention that includes a 1×10 splitter chip 20 wherein branching waveguide network includes j=5 splitters 36. Splitter chip 20 includes a branch waveguide 100 that branches off at the first (i.e., the most input-end-wise) splitter 36 and that proceeds directly to its corresponding output port 41. This particular output port provides approximately ½ output power (i.e., has 3 dB attenuation) as compared to the power inputted into input waveguide 32 (minus insertion loss and excess loss). This amount of output power is more than what is wanted in the output signal and so the corresponding port 41 is therefore considered unsuitable for use. Splitter chip 20 also includes a second branch waveguide 102 that branches off at the second splitter 36 and that proceeds directly to its corresponding output port 41. This particular output port provides approximately ¼ output power (i.e., has 6 dB attenuation). This amount of output power is also more than what is wanted in the output signal and so the corresponding port 41 is also considered unsuitable for use.

The remaining portion of branching waveguide network 30 includes additional splitters 36 that form eight output waveguides 40 each having corresponding output ports 41 that provide 1/32 output power (i.e., 15 dB attenuation). These eight output ports 41 are shown as optically coupled to corresponding optical fibers 78 via fiber array 60 that has eight optical fiber sections 74. Light carried by waveguides 100 and 102 exits their respective ports 41 and is dissipated by material (e.g., glass) of body 61 of fiber array 60. Waveguides 100 and 102 are thus "dead-ended" by output waveguide device 60 and are only present to provide the desired 15 dB attenuation for the other eight output ports.

Figure 5:
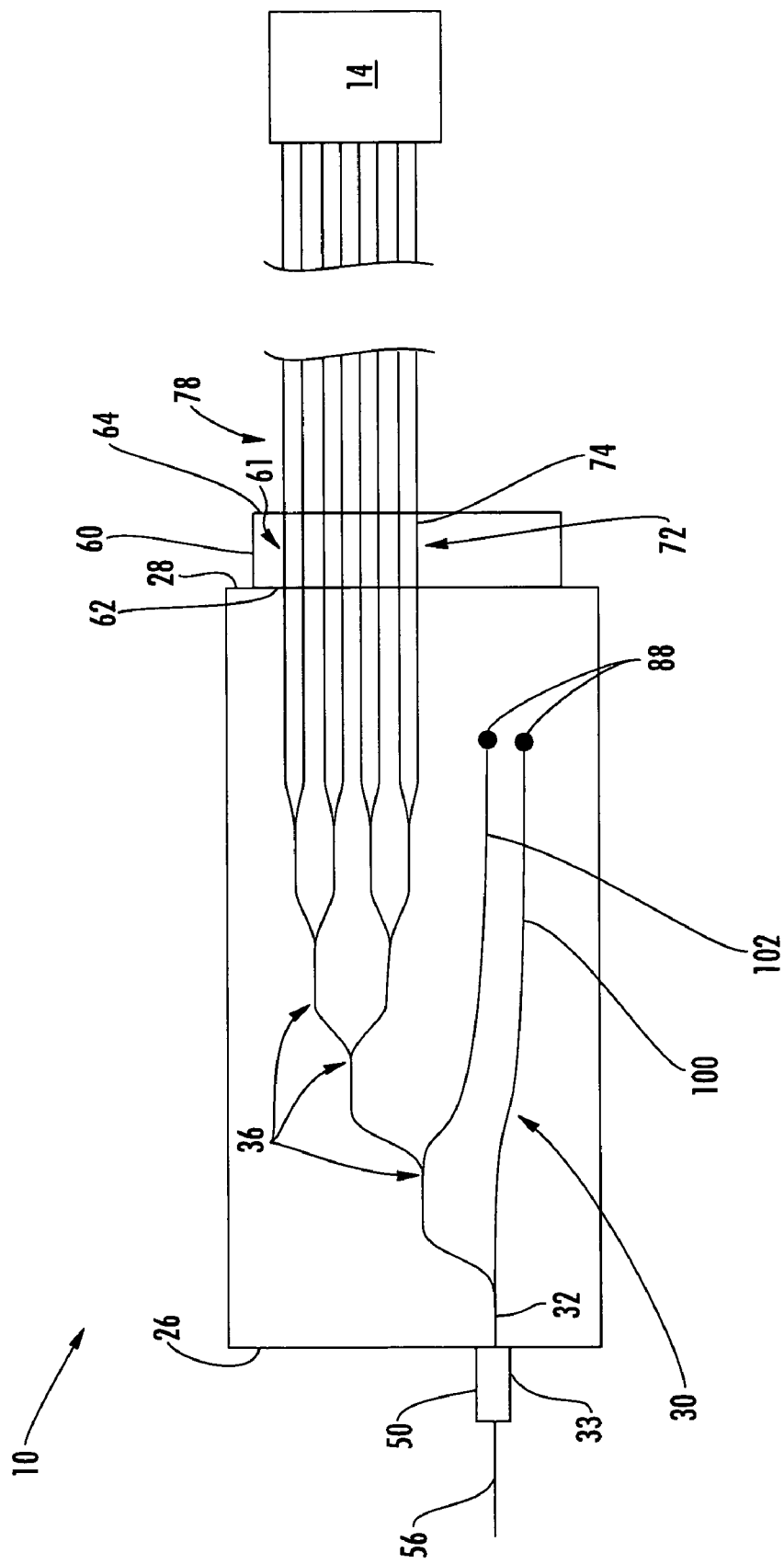
FIG. 5 is a plan schematic diagram of an example embodiment of the 1×8 attenuated planer splitter module similar to that of FIG. 4, wherein the two branch waveguides are terminated prior to reaching the splitter chip end.

FIG. 5 is a plan schematic diagram of an example embodiment of an attenuated planer splitter module similar to that shown in FIG. 4, but wherein waveguides 100 and 102 have respective terminations 88 prior to the waveguide reaching splitter chip end 28. Terminations 88 absorb the light energy in waveguides 100 and 102, or cause some or all of the light to be absorbed or otherwise dissipated by splitter chip body 22. This obviates the need to dissipate the light energy carried by these waveguides using fiber array 60.

Using any of the above methods, various splitter modules, e.g., 1×4, 1×8 and 1×16 splitter modules, can be produced with about 15 to about 17 dB insertion loss using a branching waveguide network 30 that includes n=32 output ports (e.g., j=5 splitters 36) ("1/32 splits"). Additionally, 1×4 and 1×8 splitters can be produced with ~12 to 14 dB insertion loss using a branching waveguide network 30 that includes n=16 output ports (i.e., j=4 splitters 36) ("1/16 splits"). Using these methods, any combination of 1×m splitter modules with 1×n splitter loss may be made, such as 1×2 splitter module with about 15 to about 17 dB insertion loss using 1/32 splits or with about 12 to about 14 dB loss using 1/16 splits; 1×32 s with 1/64 splits, etc. Also as discussed above, configurations with j splitters wherein the number of suitable output ports m<$2^j$ are also possible, where these suitable output ports have an associated attenuation in dB given by $A_O=10 \log(2^j)$.

Direct-connect Splitter Module

As discussed above, present-day splitter modules are made up of separate main parts: a splitter chip, an input connector (ferrule), and an output waveguide device (waveguide array), as well as the external connectors that attached thereto. External connectors are connected to the module so that communication through the module between external input and output devices can be established.

Figure 6:
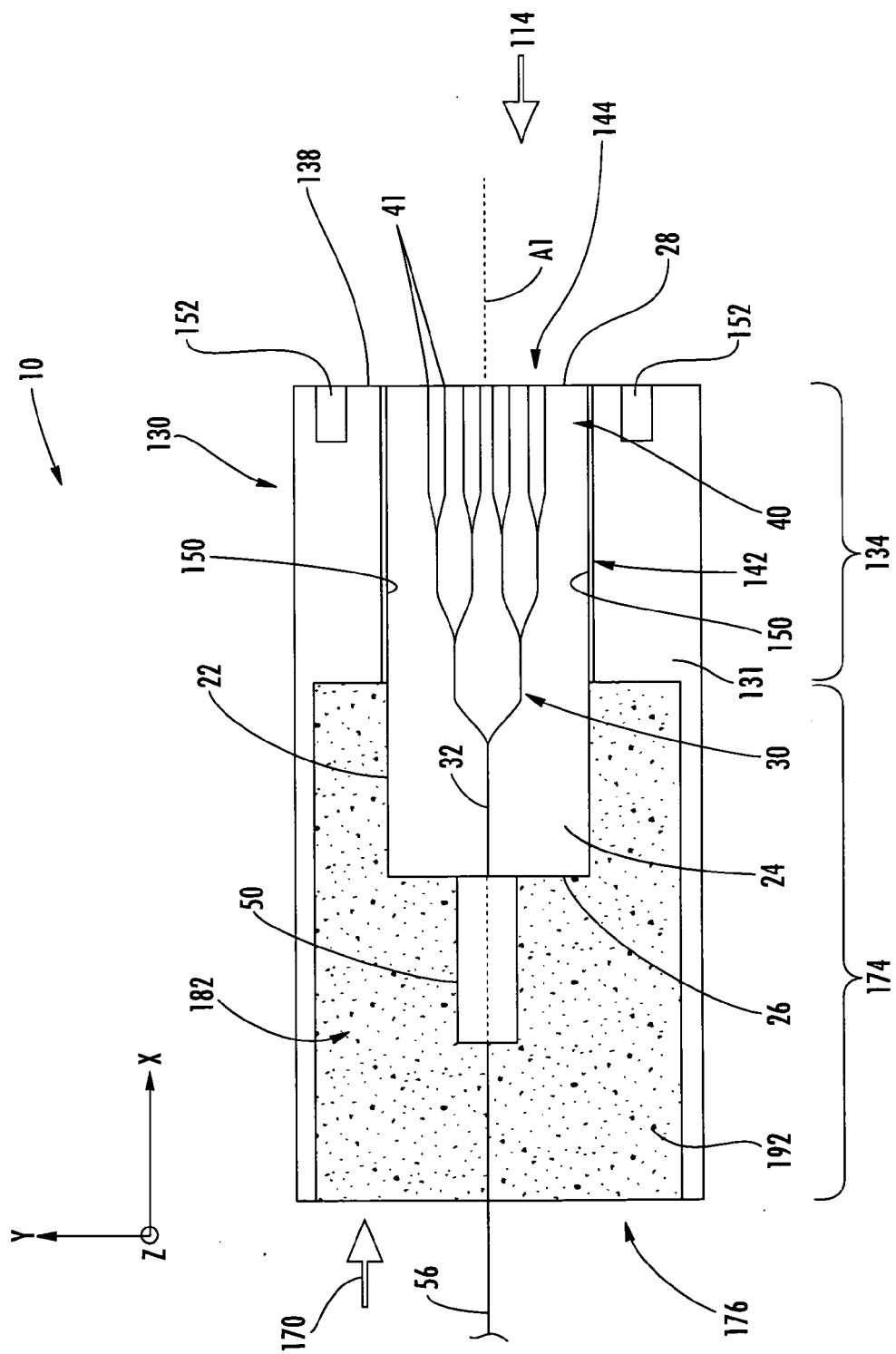
FIG. 6 is a plan cut-away view of an example embodiment of a direct-connect splitter module according to the present invention.
Figure 7:
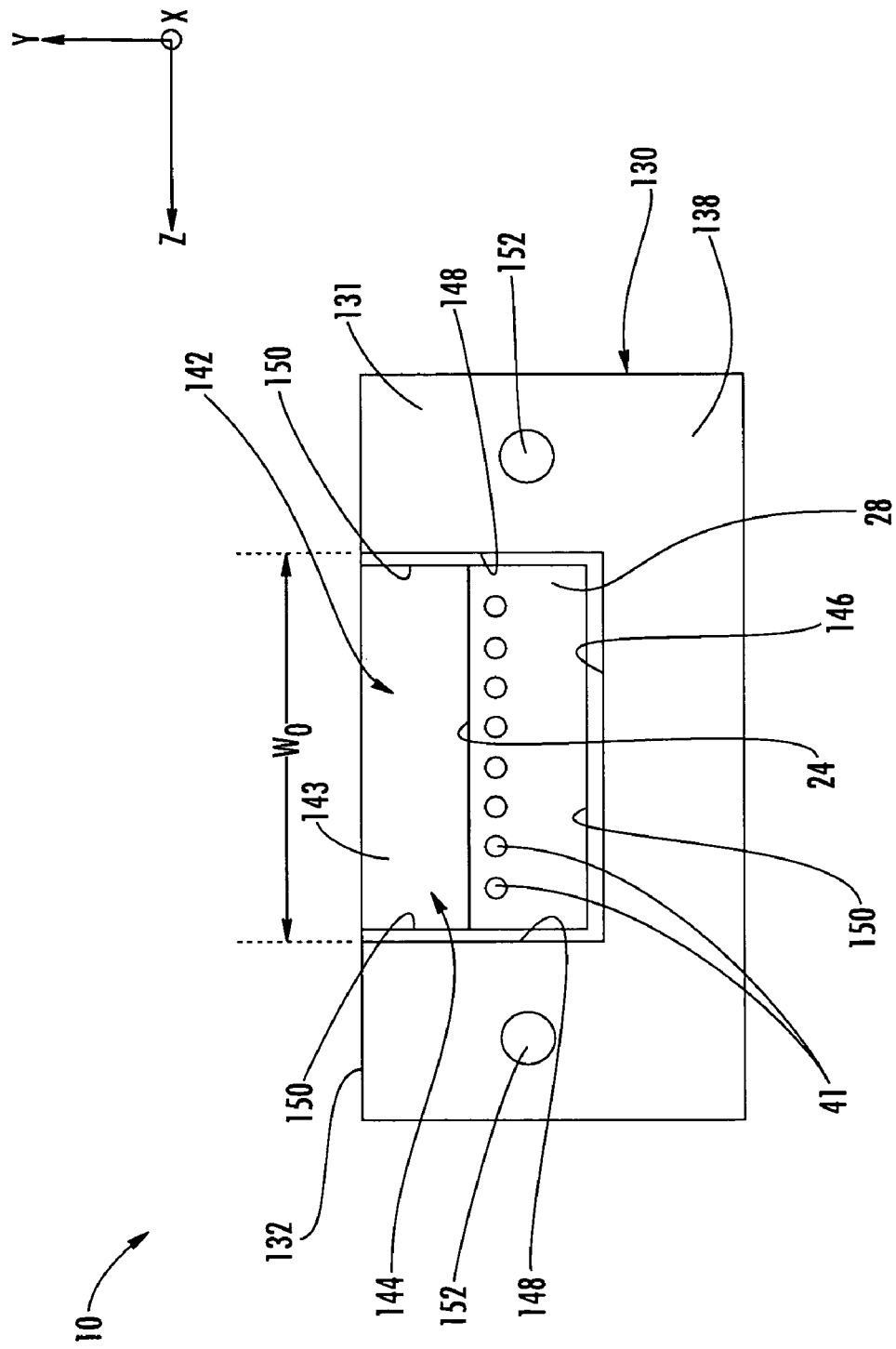
FIG. 7 is an end-on view of the multi-fiber output end of the direct-connect splitter module of FIG. 6.

FIG. 6 is a plan schematic diagram of an example embodiment of a direct-connect splitter module 10 according to the present invention. X-Y-Z Cartesian coordinates are provided for the sake of reference (Z is out of the page). Module 10 includes a splitter chip 20 as described above, and an input ferrule 50 attached to splitter chip input end 26. Ferrule 50 accommodates input optical fiber 56 that is optically coupled to input waveguide 32. Notably absent from splitter module 10 of FIG. 6 is optical fiber array 60 normally located at output end 28 of splitter chip 20 to facilitate connecting the splitter chip to external optical fibers 78 (see FIG. 2). FIG. 7 is an end-on view of direct-connect splitter module 10 as seen looking along arrow 114 (i.e., in the −X direction).

Figure 8:
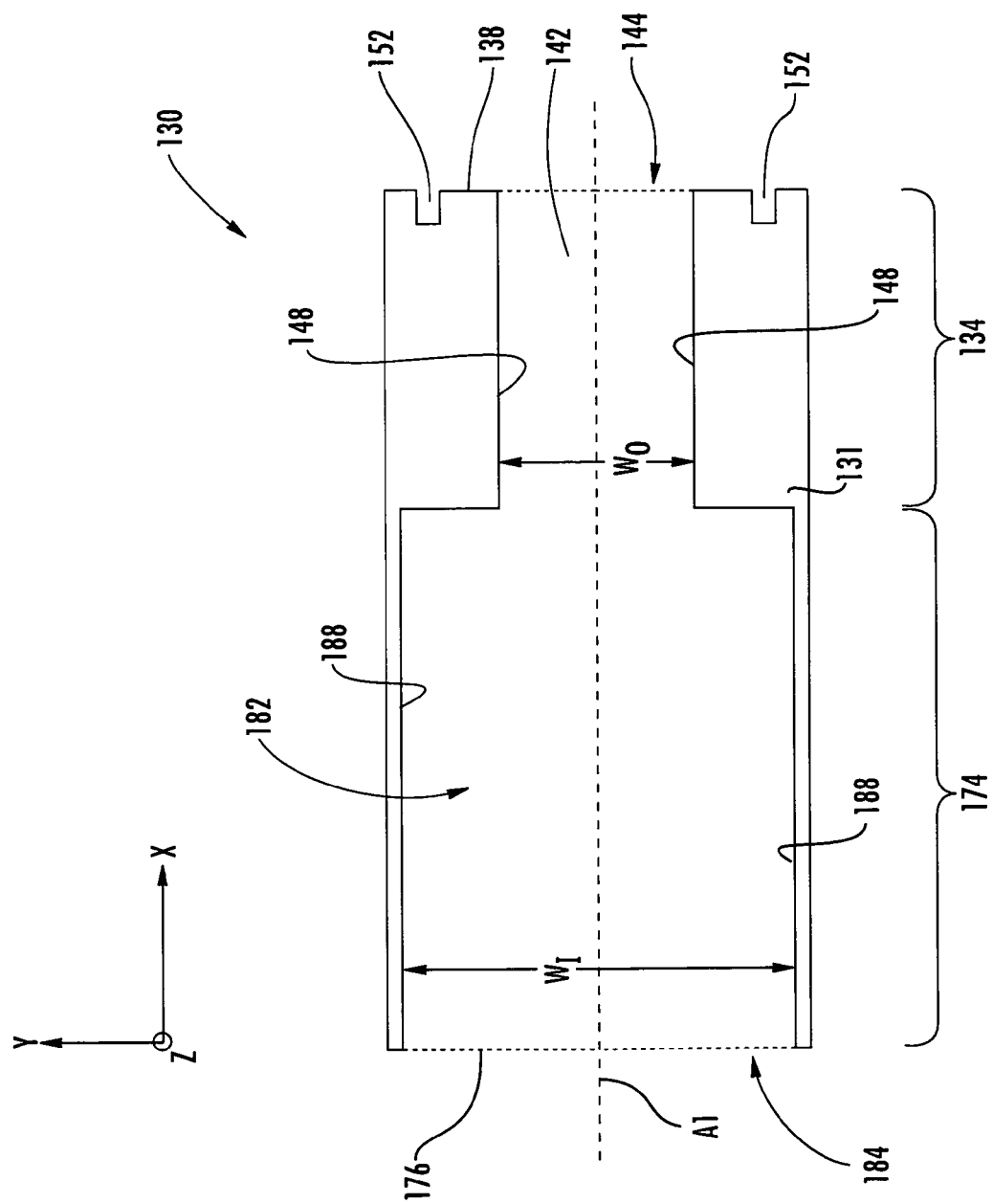
FIG. 8 is a plan cut-away view of the ferrule body used in the direct-connect splitter module of FIG. 6.

With reference to FIG. 6 through FIG. 8, splitter module 10 includes a ferrule 130 (e.g., a multi-fiber ferrule) having a central axis $A_1$, a body 131, and an upper surface 132. Splitter module 10 includes an output end portion 134 that includes an output end 138 and an input end portion 174 that includes an input end 176. FIG. 8 is a plan schematic diagram similar to FIG. 6, but showing just ferrule 130. Ferrule 130 includes an output-end channel 142 formed in upper surface 132 and centered along central axis $A_1$ and that includes an open end 144 at output end 138. Output-end channel 142 is defined by a lower wall 146 and two opposing sidewalls 148 that define an output-end channel width $W_O$. Channel width $W_O$ is sized so that output-end channel 142 closely accommodates at least the output-end section of splitter chip 20 so that splitter chip output end 28 substantially coincides with the Y-Z plane defined by output end 138.

Splitter chip 20 (or at least the output-end portion thereof) is axially aligned within output-end channel 142 and is closely held therein using, for example, an adhesive layer 150 provided on lower wall 146 and/or sidewalls 148. An important step forming direct-connect splitter module 10 is the close control adhesive layer 150. Adhesive layer 150 is preferably as thin as possible. Further, the shrinkage and potential rate actions of adhesive layer 150 needs to be taken into account so that proper alignment is maintained. In an example embodiment, adhesive layer 150 is formed using a two-step process. The first step involves prefixing with a very little amount of adhesive to minimize the adverse effects of adhesive shrinkage. The second step uses a larger amount of adhesive to achieve long-term fixing of splitter chip 20 to walls 146 and/or 148.

In an example embodiment, a planar glass cover 143 is fixed atop upper surface 24 of splitter chip 20 and is sized to fill the remaining space in output-end channel 142 up to upper surface 132 of ferrule body 131.

Output end 138 includes one or more guide members 152 on either side of output-end opening 144 that correspond to the position of output ports 41 of output waveguides 40 in planar splitter chip 20. In an example embodiment, one or more guide members 152 are guide pins or guide holes—for example of the type used with a standard MTP connector and/or the connector of the type disclosed in U.S. patent application Ser. No. 11/076,684 filed Mar. 10, 2005 and assigned to the present assignee, the disclosure of which is hereby incorporated by reference. In general, the type and position of the guide members 152 correspond to the particular connector type being used.

Figure 9:
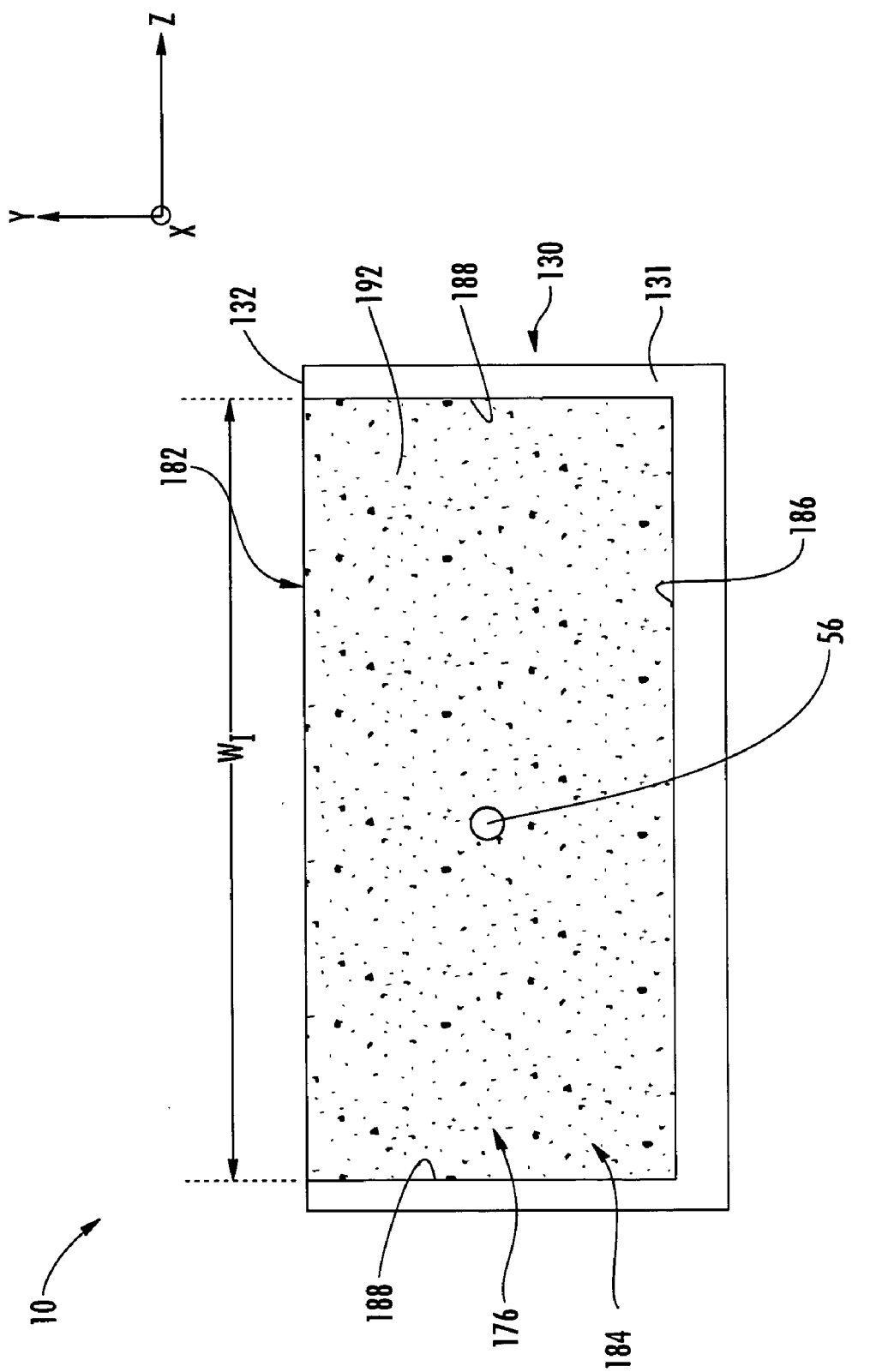
FIG. 9 is an end-on view of the single-fiber input end of the direct-connect splitter module of FIG. 6.

FIG. 9 is an end-on view of input end 176 of direct-connect splitter module 10 as seen looking along arrow 170 (i.e., in the +X direction). Input-end section 174 of ferrule 130 includes an input-end channel 182 formed in surface 132 of body 131 and centered along central axis $A_1$. Input-end channel 182 has an open end 184 at input end 176. Input-end channel 182 is defined by a lower wall 186 and two opposing sidewalls 188 that define an input-end channel width $W_I$. Channel width $W_I$ is sized so that input-end channel 182 axially accommodates the input-end section of splitter chip 20 as well as ferrule 50. Input-end interior width $W_I$ is preferably greater than output-end interior width $W_O$ so that the remainder of input-end channel 182 can be filled with a thermosetting resin 192 (e.g., potting compound) that serves to hold splitter chip 20, ferrule 50 and input optical fiber 56 in mutual alignment within input-end section 174 of ferrule 130.

Figure 10:
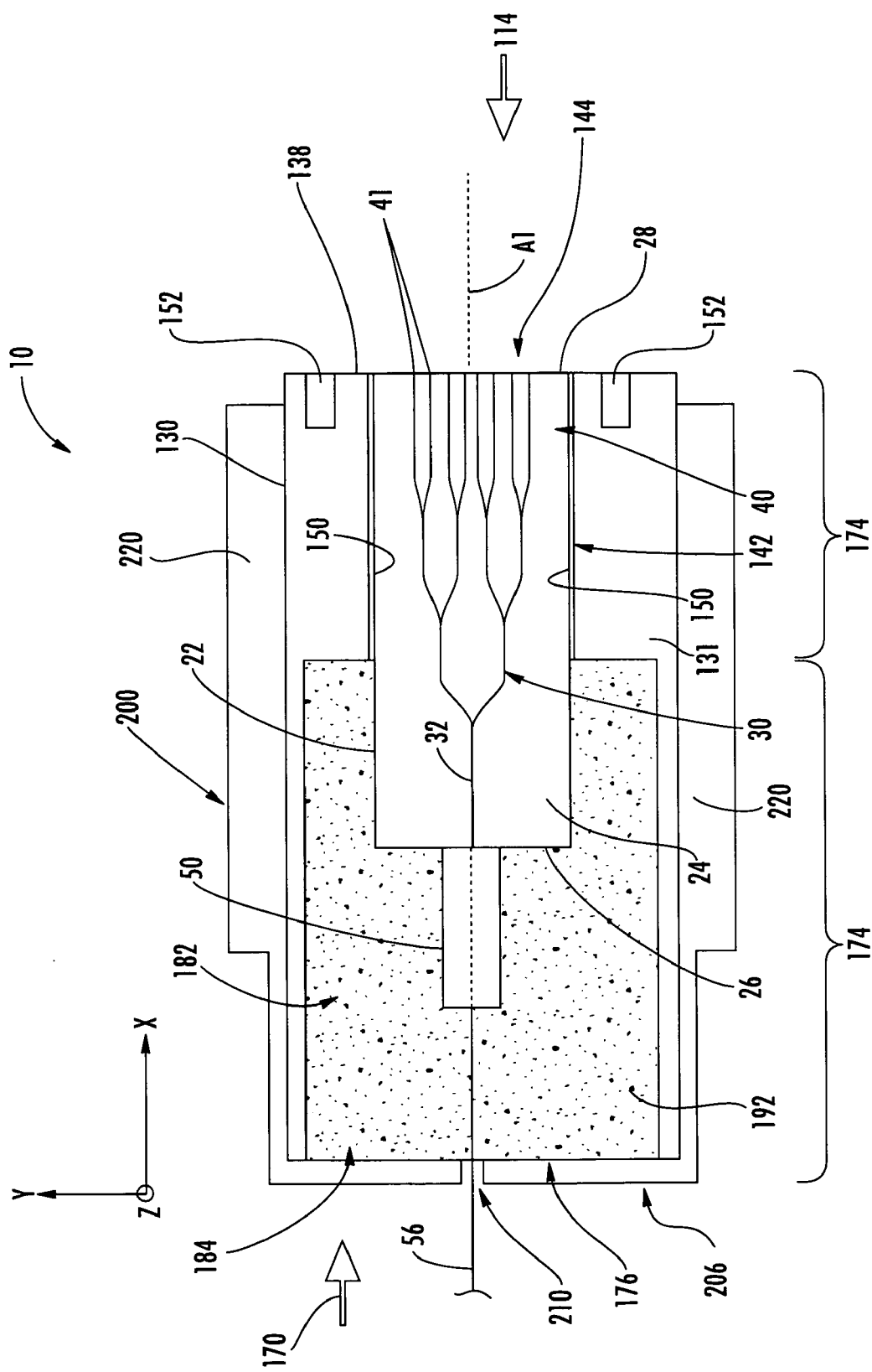
FIG. 10 is a plan cut-away view similar to that of FIG. 6 but showing an outer housing formed to have features associated with an MTP-type connector.
Figure 11:
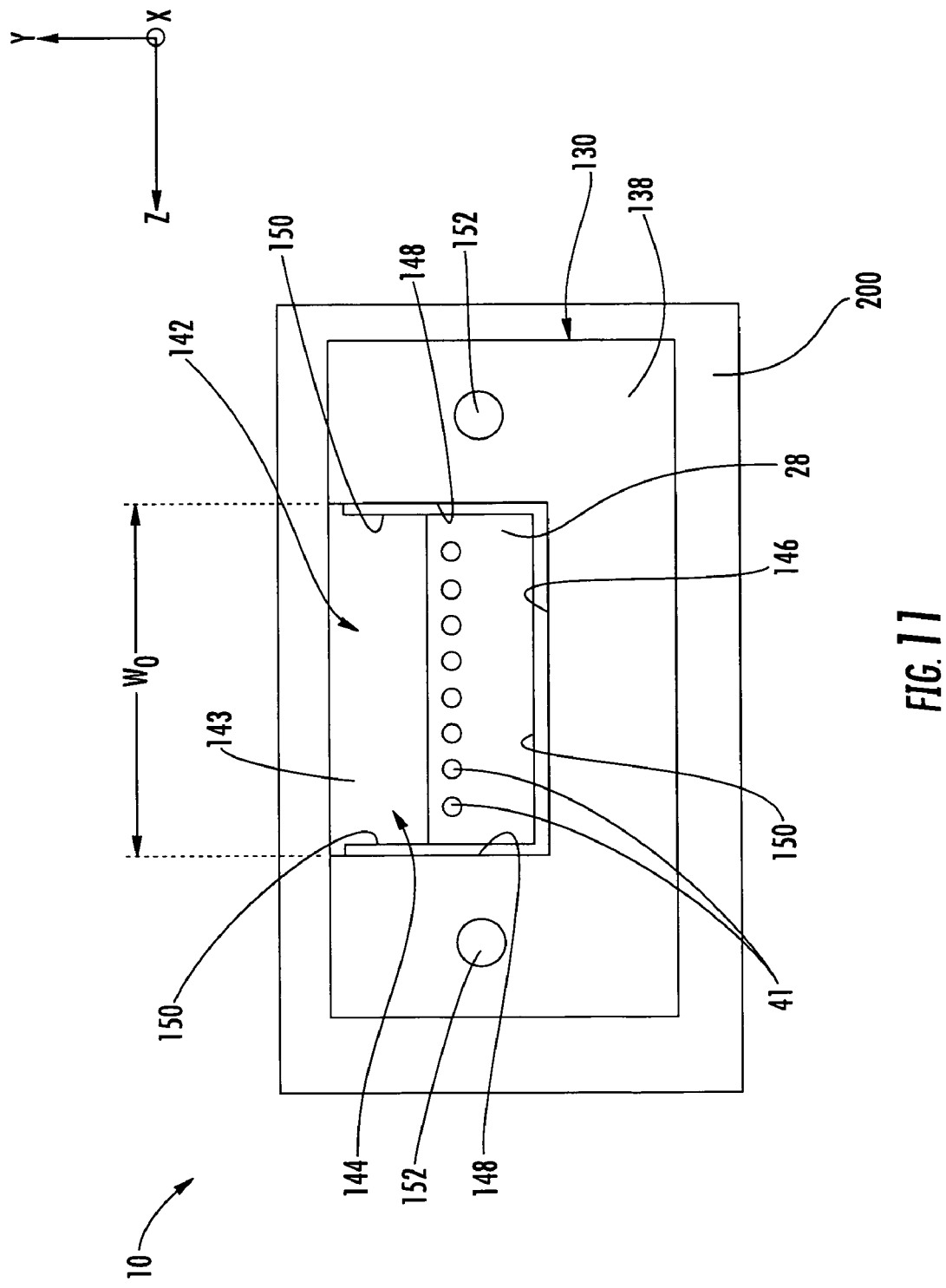
FIG. 11 is an end-on view similar to that of FIG. 7, but showing the outer housing.

In an example embodiment illustrated in FIG. 10 and FIG. 11, direct-connect splitter module 10 includes a housing 200 that surrounds at least a portion of ferrule 130. Housing 200 includes an input end 206 that covers input open end 184 so as to contain thermosetting resin 192, and that includes a opening 210 sized to pass input optical fiber 56 to ferrule 50. In an example embodiment, housing 200 also includes a section 220 that makes the module output-end section 134 conform or otherwise be compatible with a particular type of multi-fiber connector, such an MTP connector. For example, housing 200 can be formed to be compatible with spring-and-lock type guide members 152, and can have dimensions similar to an MTP connector, which dimensions are 30 mm×7 mm×12 mm.

Figure 12:
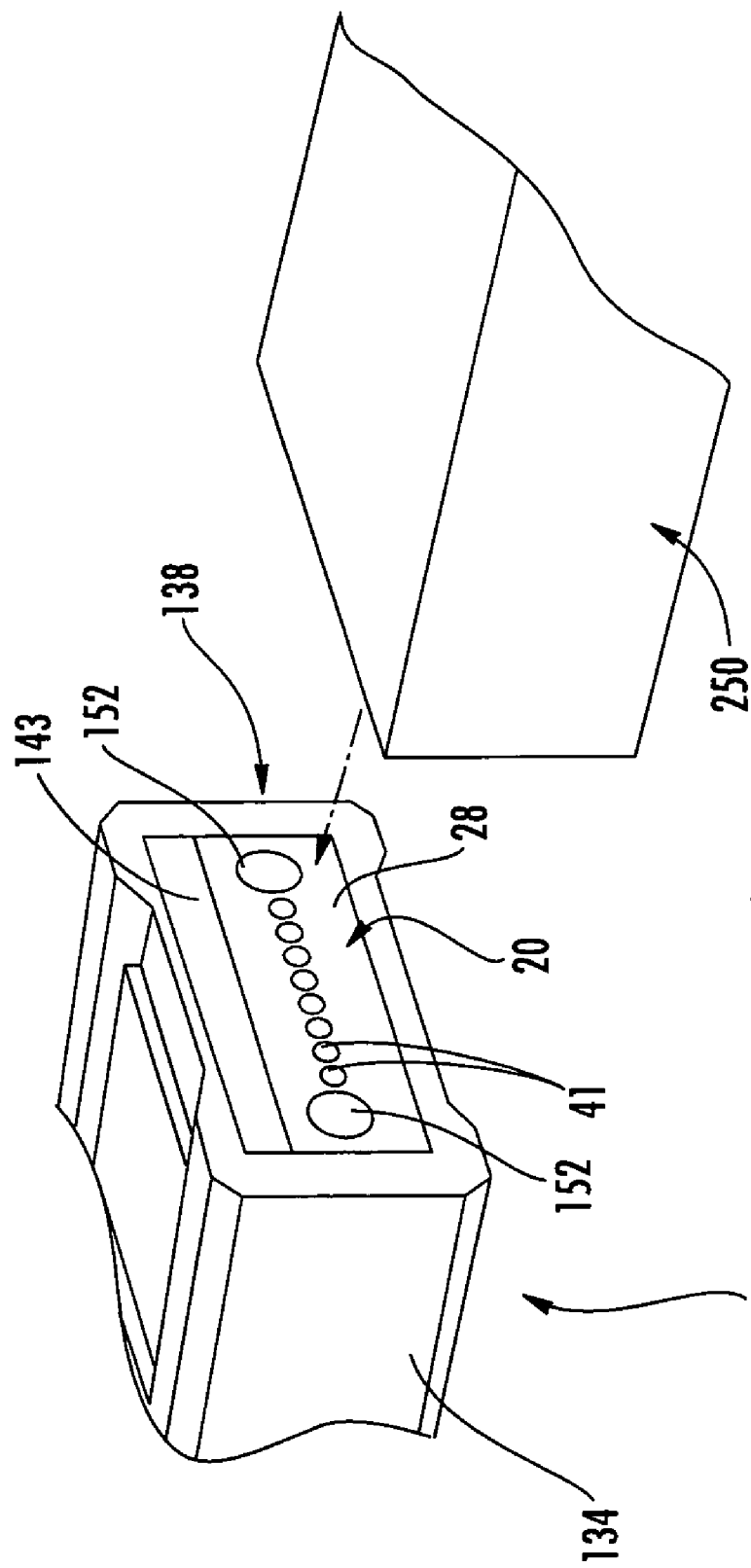
FIG. 12 is a perspective end-on view of the output end of the direct-connect splitter module having the form an MTP-type connector, shown along with a MTP-type mating connector that establishes optical communication with an external device.

FIG. 12 is a perspective end-on view of output end 138 of direct-connect module 10, wherein the output end is in the form an MTP connector. Also shown in FIG. 12 is a mating connector 250 that establishes optical communication with an external device (not shown). Direct-connect splitter module 10 allows external connector 250, such as an MTP mating connector, to be directly connected to output ends (ports) 41 of output waveguides 40 in splitter chip 20 without the need for fiber array 60 or like waveguide array.

In an example embodiment, direct-connect splitter module 10 includes a planar splitter chip 20 with a glued single-fiber ferrule 50 in an MTP-adapted output end 138 (FIG. 12). Also in an example embodiment, output waveguides 40 of planar splitter chip 20 have the same pitch as an MTP ferrule. Therefore, instead of a ferrule, the planar splitter chip can be placed inside an elongated MTP-ferrule housing 200. Alignment and fixation with external connector 250 is achieved using guide members 152, e.g., guide pins and/or other types of retention members, such as clips.

The direct-connect splitter module 10 of the present invention provides a number of advantages over a conventional splitter module. First, there is a significant reduction in cost, since for each direct-connect splitter module the expense and labor associated with including fiber array 60 and the associated connectors is avoided. In addition, labor costs can be reduced by using automated image recognition of splitter waveguides 40 and guide members 152, which allow a faster alignment without any optical connections. In addition, the size of direct-connect splitter module 10 can be made significantly smaller than a conventional splitter module, so that the splitter module of the present invention can be used in smaller cabinets, closures, or other small access points, or can be directly integrated into cables or ducts. Overall, better optical and reliability performance may be achieved because the additional loss that usually occurs between the fiber array and the planar splitter chip is avoided.

In an example embodiment, housing 200 is formed from or otherwise includes the same basic material (or a material with similar thermal expansion coefficient) as an MTP ferrule, and has the same form as an MTP-connector on the connector side, such as shown in FIG. 12. A standard planar splitter chip 20 already has the same output waveguide pitch as an MTP-ferrule.

In an example embodiment, the alignment of splitter output waveguides 40 relative to guide members 152 is performed by automated image recognition. In this case, no optical connections are necessary. Housing 200 has a fixed position, with splitter chip 20 mounted to an alignment station so that it can be moved in all directions inside a slot of the housing. In an example embodiment, the housing is moved while splitter chip 20 is fixed in position.

The direct-connect splitter module 10 of the present invention as described above provides for a direction connection at output end 138 of output-end section 174. However, the direct connection can be formed on input-end section 174 at splitter chip input end 26 using the same or similar approach. Likewise, a direct-connect module 10 can be formed that has a splitting ratio besides the 1×8 ratio shown (e.g. 1×2, 1×4, 1×16, 1×32, 1×64, 2×16, 2×32, 2–1×8, 2–1×16, 4–1×8, etc) using the methods of the present invention. Any other PLC (planar lightwave circuit) chip can be assembled using the same technology. In an example embodiment, the use of materials in direct-connect module 10 that have the same or like coefficients of thermal expansion (CTE) of the particular connector used with the module is preferred. For example, it may be advantageous to use a polymer-based material for splitter chip body 22 when the intended use for the module is with a polymer-based connector 250 (FIG. 12).

Microsplitter Module

Present-day splitter devices are on the order of 50 mm×10 mm×4 mm and are integrated in a larger splitter module, typically on the order of 150 mm×100 mm×30 mm. In present-day splitter modules, one can differentiate between the splitter device and the splitter module. Such splitter modules are currently extensively used in FTTx applications. The microsplitter module according to the present invention and described immediately below seeks to provide a very small connectorized splitter that serves as device and module at the same time so that the differentiation between device and module is, for all practical purposes, eliminated.

Figure 13:
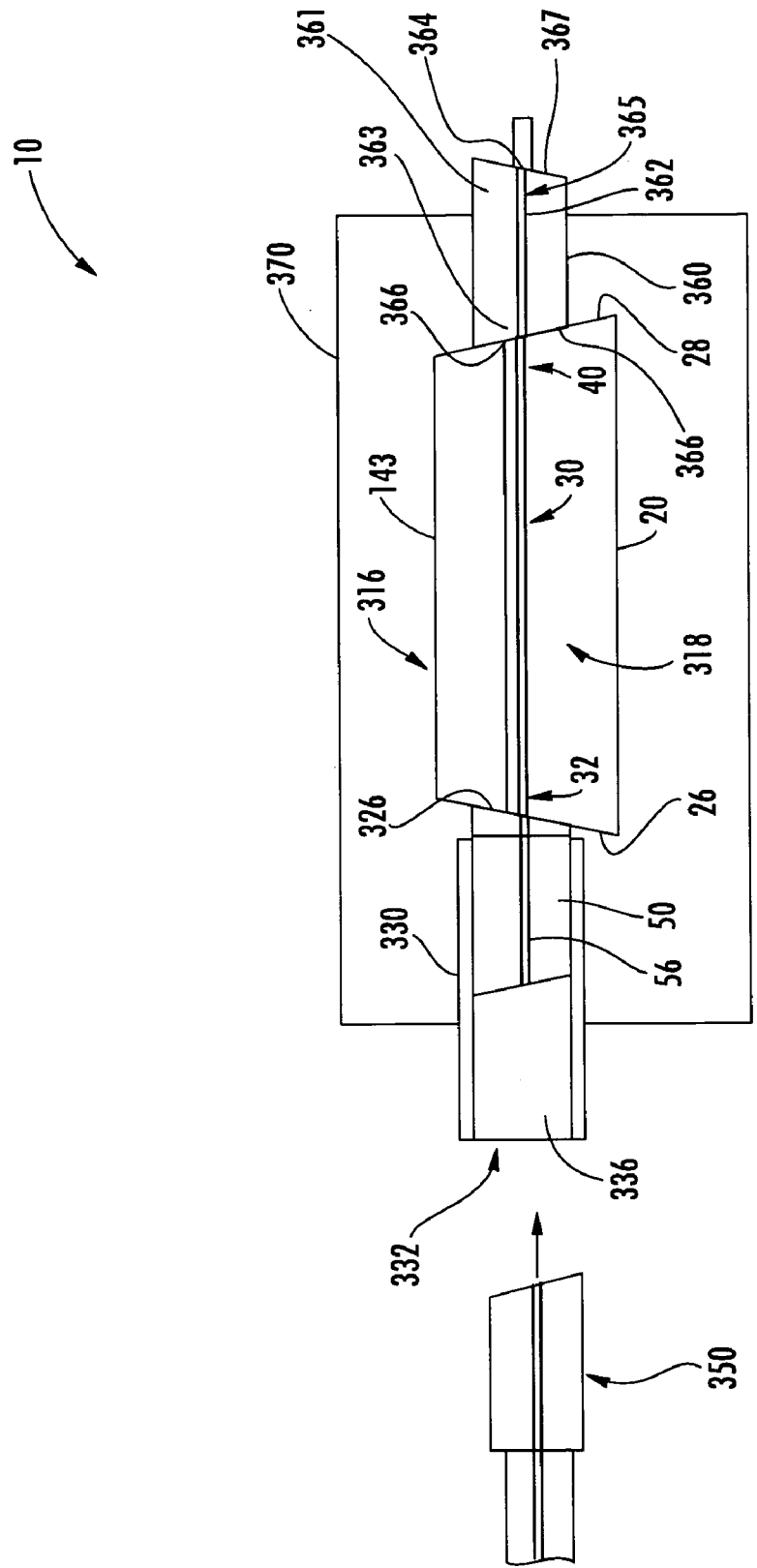
FIG. 13 is a schematic side cut-away view of an example embodiment of a microsplitter module according to the present invention.

FIG. 13 is a side cross-sectional diagram of an example embodiment of a microsplitter module 10 according to the present invention. Module 10 includes a splitter chip assembly 316 that has a body 318 made up of planar splitter chip 20 and planar glass cover 143. In an example embodiment, splitter chip assembly 316 includes beveled input and output ends 26 and 28 and the corresponding ends of planar glass cover 143 are also beveled to match.

Module 10 also includes input ferrule 50 attached to input end 26 of splitter chip 20 and that provides optical coupling between input optical fiber 56 and input waveguide 36 of branching waveguide network 30. In an example embodiment, input ferrule 50 is an angled polished connector (APC) having a beveled end 326 that matches input beveled end 26 of splitter chip assembly 20. A connector sleeve 330 covers input ferrule 50 and has an open end 332 that opens to an interior 336. Connector sleeve 330 is adapted to facilitate optically connecting input optical fiber 56 to an external optical fiber cable 350.

Module 10 further includes a multi-fiber ferrule 360 having a body 361 that supports a plurality of output optical fibers 362 that each include an input end 363 and an output end 364. Output optical fibers 362 are arranged in holes 365 that run through ferrule 360 from an input end 366 to an output end 367. Holes 365 are formed to have the same pitch as output waveguides 40 of splitter chip 20 so that optical fiber output ends 364 have the same pitch as the output waveguides.

In an example embodiment, multi-fiber ferrule 360 is attached (e.g., bonded) to output end 28 of splitter chip 20 so that output waveguide ends 41 of output waveguides 40 are optically coupled (e.g., butt-coupled) to the corresponding input ends 363 of output optical fibers 362. In an example embodiment, multi-fiber ferrule 360 includes a beveled end 368 that matches output beveled end 28 of splitter chip assembly 316.

Microsplitter module 10 includes a housing 200 that contains most if not all of each of the input ferrule 50, multi-fiber ferrule 360 and splitter chip assembly 316. In an example embodiment, housing 200 is formed (e.g., molded) to conform to a particular multi-fiber connector type to be used with the module, such as an MTP-type multi-fiber connector. Housing 200 also serves to support the input ferrule 50, multi-fiber ferrule 360 and splitter chip assembly 316 and to maintain these elements in mutual alignment, particularly during use in the field.

Figure 14:
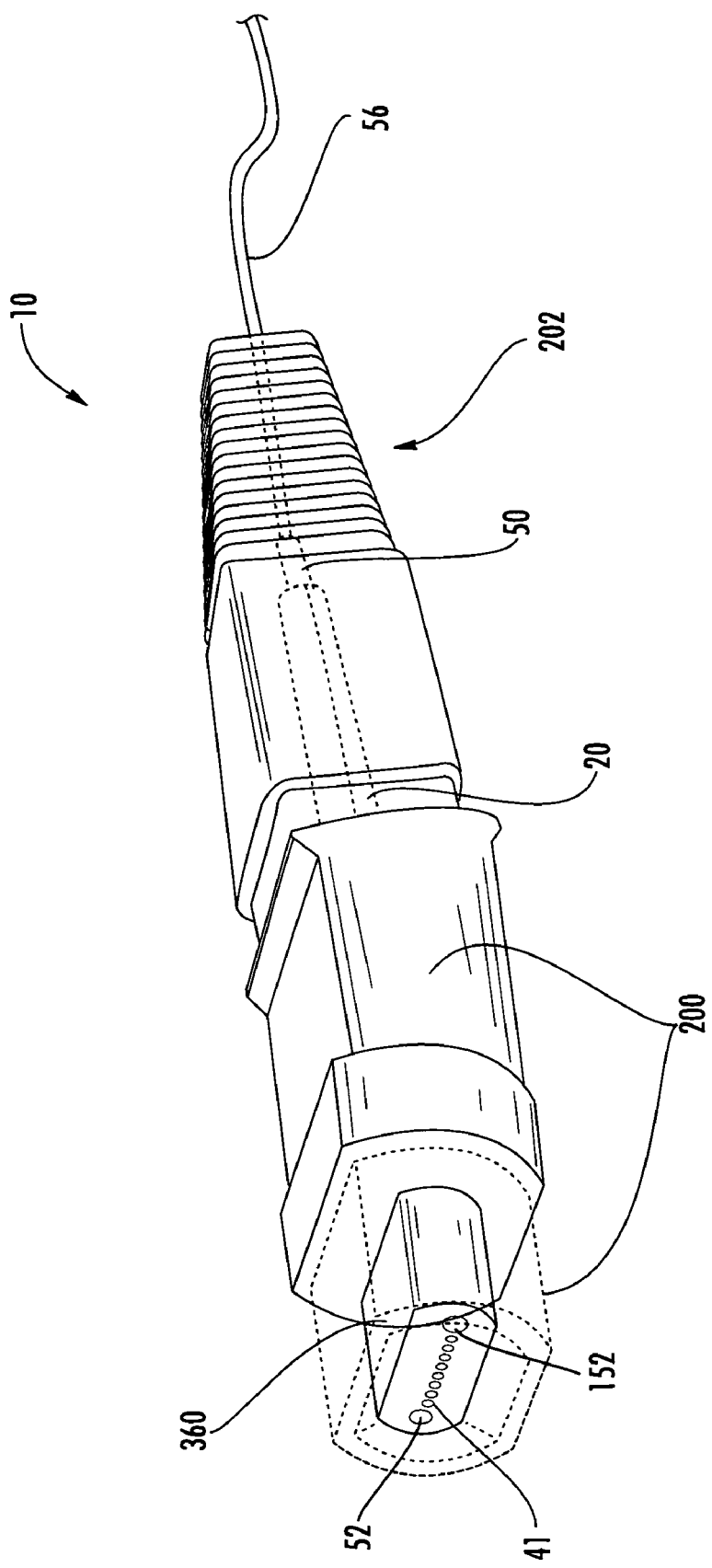
FIG. 14 is a perspective view of an example embodiment of a microsplitter module according to the present invention wherein the housing is formed so that the module is compatible with an MTP-type connector.

FIG. 14 is a perspective view of an example microsplitter module 10 according to the present invention, wherein housing 200 is formed so that the module is amenable for use with MTP-type connectors. Housing 200 also includes a boot section 202 that contains input ferrule 50 and input optical fiber 56 in a pigtail configuration. The microsplitter module 10 of FIG. 14 illustrates the utility of the present invention with respect to incorporating the module directly into a cable assembly.

Figure 15:
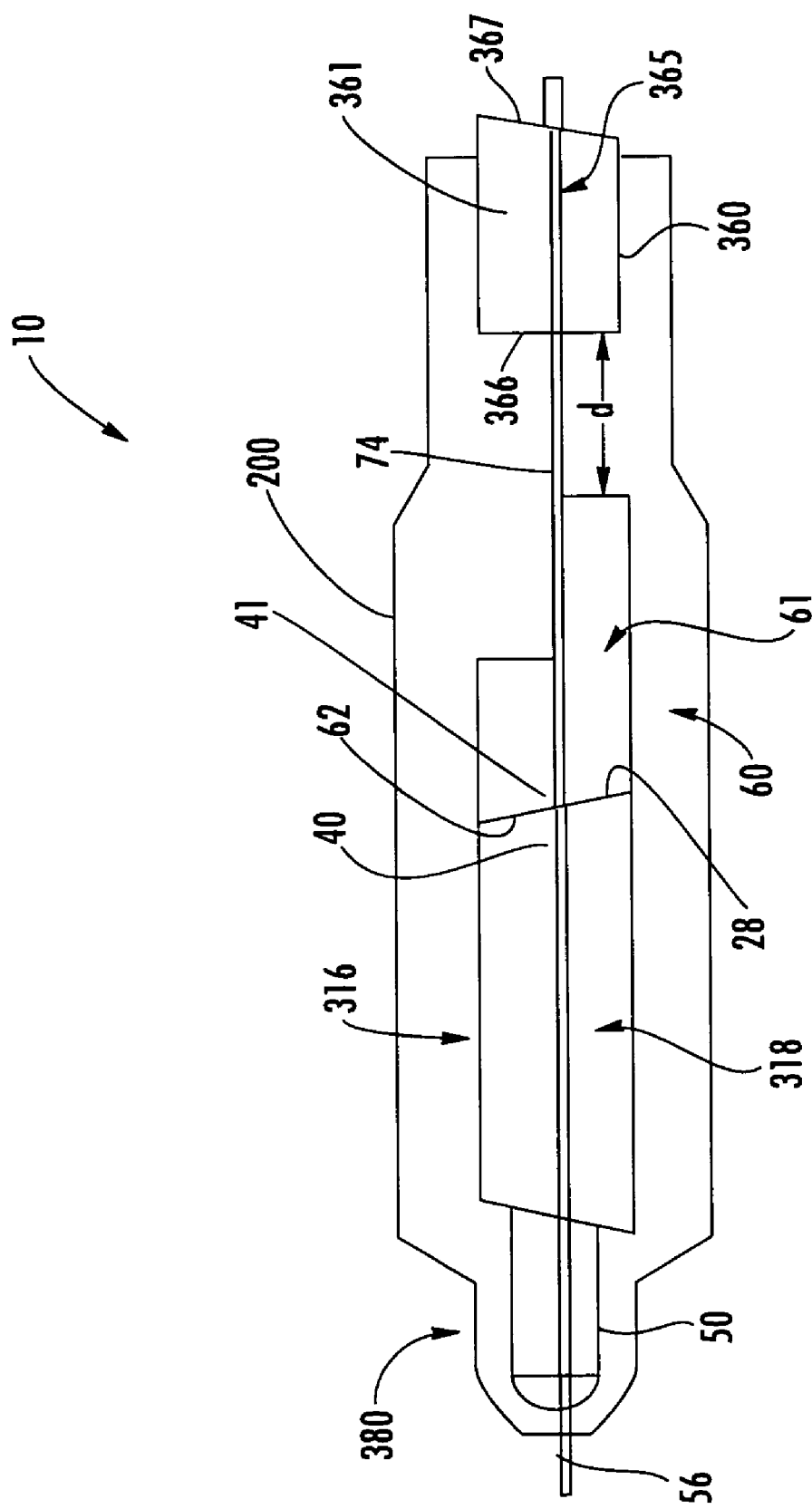
FIG. 15 is a side cut-away view similar to FIG. 13 that illustrates another example embodiment of microsplitter module that includes a fiber array arranged between the splitter chip and the ferrule, and also including a fiber pigtail at the input end.

FIG. 15 is a side cut-away view similar to FIG. 13 that illustrates another example embodiment of microsplitter module 10 that includes fiber array 60 arranged between splitter chip output end 28 and multi-fiber ferrule 360. Microsplitter module 10 is also shown as having pigtail input 380 formed by input ferrule 50 and input optical fiber 56.

Figure 16:
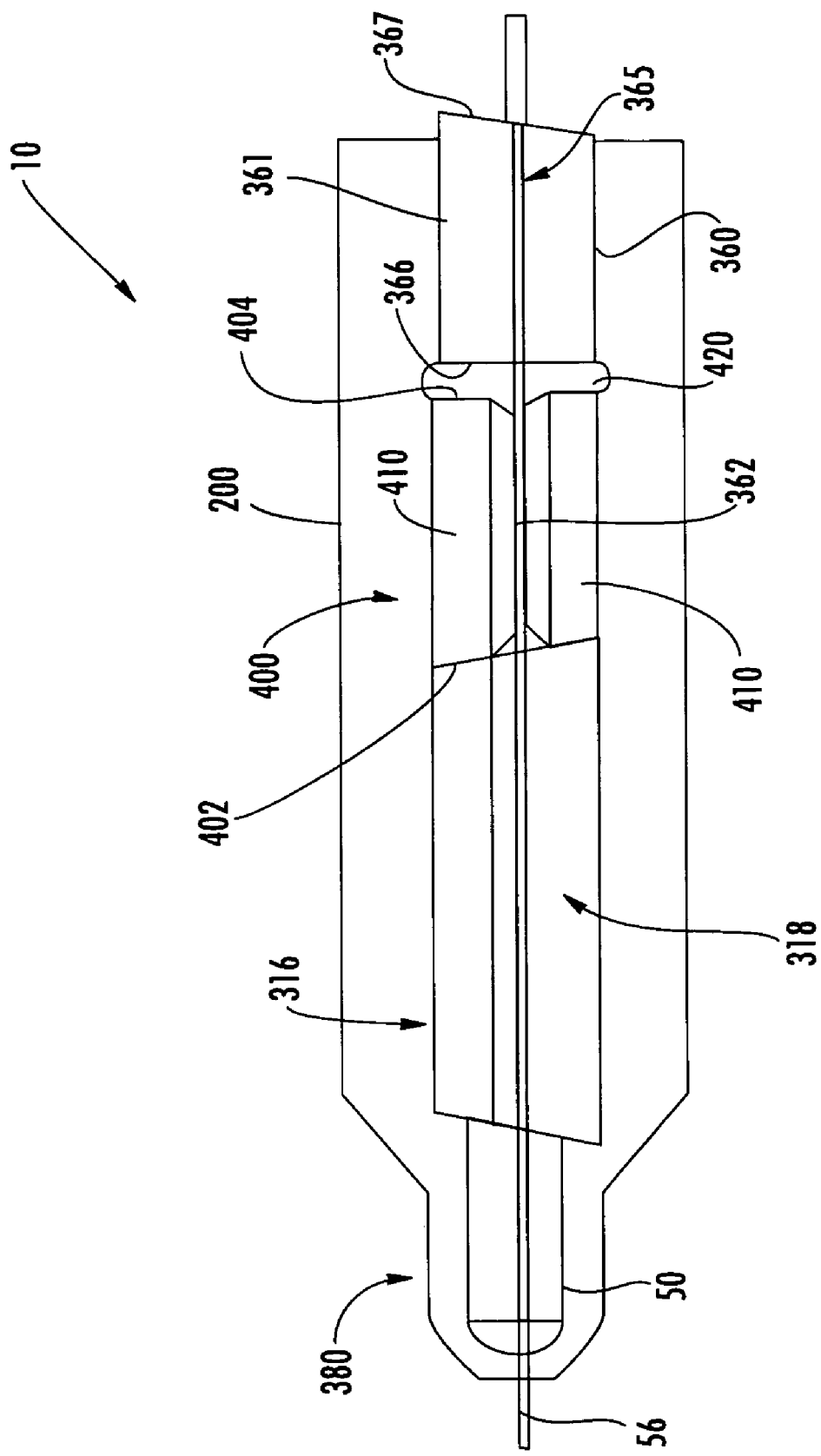
FIG. 16 is a side cut-away view similar to FIG. 13, illustrating another example embodiment of a microsplitter module wherein the fiber array is replaced by a direct fiber bonding unit.

In microsplitter module 10 of FIG. 15, input end 62 of fiber array 60 is attached (e.g., bonded) to output end 28 of splitter chip assembly 316 so that optical fiber sections 74 supported by fiber array 60 are optically coupled to output waveguides 40 of splitter chip 20 at output ports 41. Optical fiber sections 74 then serve as the output fibers 362. Optical fiber sections 74 run through holes 365 in multi-fiber ferrule 360. Multi-fiber ferrule 360 is spaced apart from waveguide device 60 by a distance d (e.g., d=1 cm). This configuration (called a "CTE-matched output configuration") is advantageous in that it avoids adverse thermal effects due to differences in the CTE between fiber array body 61, which is typically made of glass, and multi-fiber ferrule body 361, which is typically made of a glass-filled plastic having a substantially different CTE than glass FIG. 16 is a cut-away side view of another example embodiment of microsplitter module 10 similar to that of FIG. 15, wherein fiber array 60 is replaced by a directly bonded fiber assembly 400 having an input end 402 and an output end 404. Thermal stabilization unit 400 is mechanically decoupled from multi-fiber ferrule 360. In an example embodiment, directly bonded fiber assembly 400 includes glass plates 410 arranged to support output optical fibers 362.

In an example embodiment, input end 402 of thermal stabilization unit 400 is attached (e.g., bonded) to output end 28 of splitter chip 20 so that input ends 363 of output optical fibers 362 are aligned with and contacted to output ends 41 of output waveguides 40 of splitter chip 20. Directly bonded fiber assembly output end 404 is attached to ferrule 360 using a soft-interfacing adhesive 420 that accommodates different expansion rates between directly bonded fiber assembly 400 and multi-fiber ferrule 360.

The microsplitter module 10 according to the present invention provides a very small connectorized splitter that serves as device and module at the same time (i.e., the differentiation between device and module is, for all practical purposes, eliminated). The microsplitter module can be used as a single-to multi-fiber connector adapter, such as to connect a single SC/APC connectorized cable to an MTP connectorized eight-fiber-ribbon cable, or any other suitable type of single-fiber connector to multi-fiber connector.

Embodiments of the microsplitter module of the present invention that use a standard pigtail interface at the input side are particularly suitable for use in high density MDU cabinets. In an example embodiment, input optical fiber 56 is a bend performance fiber, which further reduces the space requirement for the module. The microsplitter module of the present invention integrates the device assembly process and the module assembly process into one step, thereby significantly reducing the variable cost associated with producing splitter modules. In addition, the size of the microsplitter module can be made much smaller (e.g., 60 mm×12 mm×8 mm), so that it is more amenable for use in reduced size cabinets, closures, other small size access points. Further, as mentioned above, the microsplitter module of the present invention can be directly integrated into cables or ducts.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, 0.30%<$\Delta_1$<0.40%, and 3.0 µm<R1<5.0 µm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2−R1, and W12 is greater than 1 µm. Radius R2 is preferably greater than 5 µm, more preferably greater than 6 µm. The intermediate annular hole-containing region extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

Still further embodiments of the present invention comprise fiber optic cables comprising bend resistant multimode optical fibers which comprise a graded-index core region and a cladding region surrounding and directly adjacent to the core region, the cladding region comprising a depressed-index annular portion comprising a depressed relative refractive index, relative to another portion of the cladding (which preferably is silica which is not doped with an index of refraction altering dopant such as germania or fluorine). Preferably, the refractive index profile of the core has a parabolic shape. The depressed-index annular portion may comprise glass comprising a plurality of holes, fluorine-doped glass, or fluorine-doped glass comprising a plurality of holes. The depressed index region can be adjacent to or spaced apart from the core region.

In some embodiments that comprise a cladding with holes, the holes can be non-periodically disposed in the depressed-index annular portion. By "non-periodically disposed" or "non-periodic distribution", we mean that when viewed in cross section (such as a cross section perpendicular to the longitudinal axis) of the optical fiber, the non-periodically disposed holes are randomly or non-periodically distributed across the hole containing region. Cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically located within the fiber structure. These holes are stretched (elongated) along the length (i.e. parallel to the longitudinal axis) of the optical fiber, but do not extend the entire length of the entire fiber for typical lengths of transmission fiber.

The multimode optical fiber disclosed herein exhibits very low bend induced attenuation, in particular very low macrobending. In some embodiments, high bandwidth is provided by low maximum relative refractive index in the core, and low bend losses are also provided. In some embodiments, the core radius is large (e.g. greater than 20 μm), the core refractive index is low (e.g. less than 1.0%), and the bend losses are low. Preferably, the multimode optical fiber disclosed herein exhibits a spectral attenuation of less than 3 dB/km at 850 nm.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core extends radially outwardly from the centerline to a radius R1, wherein $12.5 \leq R1 \leq 40$ microns. In some embodiments, $25 \leq R1 \leq 32.5$ microns, and in some of these embodiments, R1 is greater than or equal to about 25 microns and less than or equal to about 31.25 microns. The core preferably has a maximum relative refractive index, less than or equal to 1.0%. In other embodiments, the core has a maximum relative refractive index, less than or equal to 0.5%. Such multimode fibers preferably exhibit a 1 turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

If non-periodically disposed holes or voids are employed in the depressed index annular region, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

The outer annular portion of a cross-section of the glass portion of an embodiment of a multimode optical fiber has a substantially constant refractive index profile with a constant $\Delta 4(r)$; in some of these embodiments, $\Delta 4(r)=0\%$. The "relative refractive index percent" is defined as $\Delta\% = 100 \times (n_i^2 - n_{REF}^2)/2n_i^2$. The relative refractive index percent is measured at 850 nm unless otherwise specified. In certain embodiments, the reference index $n_{REF}$ is the refractive index of inner annular portion. The core is surrounded by and in direct contact with the inner annular portion, which has a substantially constant refractive index profile $\Delta 2(r)$. The inner annular portion is surrounded by and in direct contact with the depressed-index annular portion having refractive index profile Δ3, and the depressed-index annular portion is surrounded by and in direct contact with the outer annular portion, which has a substantially constant refractive index profile Δ4(r).

The core has an entirely positive refractive index profile, where Δ1(r)>0%. In some embodiments, the inner annular portion has a relative refractive index profile Δ2(r) having a maximum absolute magnitude less than 0.05%, and $\Delta2_{MAX}$<0.05% and $\Delta2_{MIN}$>−0.05%, and the depressed-index annular portion begins where the relative refractive index of the cladding first reaches a value of less than −0.05%, going radially outwardly from the centerline. In some embodiments, the outer annular portion has a relative refractive index profile Δ4(r) having a maximum absolute magnitude less than 0.05%, and $\Delta4_{MAX}$<0.05% and $\Delta4_{MIN}$>−0.05%, and the depressed-index annular portion ends where the relative refractive index of the cladding first reaches a value of greater than −0.05%, going radially outwardly from the radius where Δ3MIN is found. In some embodiments, the inner annular portion comprises pure silica. In some embodiments, the outer annular portion comprises pure silica. In some embodiments, the depressed-index annular portion comprises pure silica comprising with a plurality of holes. Preferably, the minimum relative refractive index, or average effective relative refractive index, such as taking into account the presence of any holes, of the depressed-index annular portion is preferably less than −0.1%. The holes can contain one or more gases, such as argon, nitrogen, or oxygen, or the holes can contain a vacuum with substantially no gas; regardless of the presence or absence of any gas, the refractive index in the annular portion is lowered due to the presence of the holes. The holes can be randomly or non-periodically disposed in the annular portion of the cladding 500, and in other embodiments, the holes are disposed periodically in the annular portion. In some embodiments, the plurality of holes comprises a plurality of non-periodically disposed holes and a plurality of periodically disposed holes. Alternatively, or in addition, the depressed index in annular portion can also be provided by downdoping the annular portion (such as with fluorine) or updoping one or more portions of the cladding and/or the core, wherein the depressed-index annular portion is, for example, pure silica or silica which is not doped as heavily as the inner annular portion.

Preferably, the inner annular portion has a radial width of greater than 4 microns. In some embodiments, the minimum relative refractive index of the depressed-index annular portion, Δ3MIN, is less than −0.10%; in other embodiments, Δ3 MIN is less than −0.20%; in still other embodiments, Δ3MIN is less than −0.30%; in yet other embodiments, Δ3MIN is less than −0.40%.

$\Delta1_{MAX}$ is preferably less than or equal to 2.0%, more preferably less than or equal to 1.0%, even more preferably less than 1.0%, and still more preferably less than or equal to 0.8%; in some embodiments $\Delta1_{MAX}$ is greater than or equal to 0.4% and less than or equal to 1.0%, and in other embodiments $\Delta1_{MAX}$ is greater than or equal to 0.5% and less than or equal to 0.75%.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta1_{MAX}$. For example, a multimode optical fiber with $\Delta1_{MAX}$ of 0.5% can yield a bandwidth 16 times greater than an otherwise identical multimode optical fiber except having a core with $\Delta1_{MAX}$ of 2.0%.

In some embodiments, the core outer radius, $R_1$, is preferably not less than 12.5 μm and not more than 40 μm, i.e. the core diameter is between about 25 and 80 μm. In other embodiments, R1>20 microns; in still other embodiments, R1>22 microns; in yet other embodiments, R1>24 microns.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An attenuated planar splitter module for providing optical communication with at least one external output device, comprising:
    a splitter chip having a body, an input end, an output end, and a branching waveguide network associated with the body and that includes an input waveguide optically coupled to an input connector at the input end, the branching waveguide network having j≧1 50:50 splitters that form up to n≦$2^j$ output waveguides having associated n output ports, wherein only m<n output ports are suitable for transmitting light to the at least one external output device; and
    a fiber array attached to the output end and adapted to provide optical coupling to the m suitable output ports of the splitter chip such that the m suitable output ports have associated therewith an attenuation in decibels of $A_O$=10 log($2^j$), wherein the unsuitability of the (n−m) output ports is due at least in part to manufacturing errors in the branch waveguide network.

2. The attenuated splitter module of claim 1, wherein the number of output ports n=$2^j$.

3. The attenuated splitter module of claim 1, wherein the fiber array is optically coupled to the at least one external output device.

4. The attenuated splitter module of claim 3, further including an input optical fiber having an input end and an output end, wherein the output end is optically coupled to the input connector of the splitter chip.

5. The attenuated splitter module of claim 4, further including an input device optically coupled to the input end of the input optical fiber.

6. An attenuated planar splitter module for providing optical communication with at least one external output device, comprising:
    a splitter chip having a body, an input end, an output end, and a branching waveguide network associated with the body and that includes an input waveguide optically coupled to an input connector at the input end, the branching waveguide network having j≧1 50:50 splitters that form up to n≦$2^j$ output waveguides having associated n output ports, wherein only m<n output ports are suitable for transmitting light to the at least one external output device; and
a fiber array attached to the output end and adapted to provide optical coupling to the m suitable output ports of the splitter chip such that the m suitable output ports have associated therewith an attenuation in decibels of $A_O$=10 log($2^j$), wherein the number of output ports n<$2^j$, and wherein the unsuitability of the (n−m) output ports is designed into the branch waveguide network in the form of at least one branch waveguide in the branch waveguide network that carries light intended to be provided to the at least one external output device, and wherein the at least one branch waveguide has an output end terminated in the splitter chip body, and wherein light carried in the at least one branch waveguide is substantially dissipated by the splitter chip body.

7. The attenuated splitter module of claim 6, wherein the optical fiber array includes a substrate, and wherein light carried in the at least one branch waveguide exits a corresponding at least one output port and is substantially dissipated by the optical fiber array substrate.

8. The attenuated splitter module of claim 6, wherein the at least one branch waveguide has an output end, and wherein light carried in the at least one branch waveguide is substantially dissipated by a termination at the branch waveguide output end.

* * * * *